United States Patent
Jo et al.

(10) Patent No.: US 11,381,965 B2
(45) Date of Patent: Jul. 5, 2022

(54) METHOD AND DEVICE FOR SETTING CUSTOMIZED FUNCTION BY MEANS OF SMART KEY FOR VEHICLES

(71) Applicant: Samsung Electronics Co., Ltd., Suwon-si (KR)

(72) Inventors: Sungmin Jo, Suwon-si (KR); Ho Yang, Hwaseong-si (KR); Kwanghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 16/485,766

(22) PCT Filed: Feb. 1, 2018

(86) PCT No.: PCT/KR2018/001406
§ 371 (c)(1),
(2) Date: Aug. 13, 2019

(87) PCT Pub. No.: WO2018/147596
PCT Pub. Date: Aug. 16, 2018

(65) Prior Publication Data
US 2019/0357045 A1     Nov. 21, 2019

(30) Foreign Application Priority Data
Feb. 13, 2017   (KR) ................ 10-2017-0019390

(51) Int. Cl.
*H04W 12/06* (2021.01)
*H04W 4/44* (2018.01)
(Continued)

(52) U.S. Cl.
CPC .......... *H04W 12/06* (2013.01); *B60R 25/102* (2013.01); *B60R 25/24* (2013.01); *H04L 63/102* (2013.01);
(Continued)

(58) Field of Classification Search
CPC ..... H04W 12/06; H04W 4/44; H04W 68/005; B60R 25/102; B60R 25/24; H04L 63/102
See application file for complete search history.

(56) References Cited

U.S. PATENT DOCUMENTS

6,501,369 B1 * 12/2002 Treharne ............... B60R 25/24
                                                                  307/10.5
9,162,648 B1 * 10/2015 Weng ................. G07C 9/00309
(Continued)

FOREIGN PATENT DOCUMENTS

JP    2008-072160 A    3/2008
JP    2012-118848 A    6/2012
(Continued)

OTHER PUBLICATIONS

ISA/KR, "International Search Report and Written Opinion of the International Searching Authority," International Application No. PCT/KR2018/001406, dated May 14, 2018, 14 pages.

*Primary Examiner* — Oleg Korsak

(57) ABSTRACT

The disclosure relates to a 5G or 6G communication system for supporting a higher data transmission rate. A method for an electronic device according to various embodiments of the present invention comprises the steps of: registering user information and user customized setting information to a security server; detecting a relevant vehicle; and performing authentication in the security server by means of the user information if the relevant vehicle is detected, wherein, if the authentication is valid, the user customized setting information registered to the security server is transmitted to the relevant vehicle. However, the present invention is not limited to the above embodiments, and other embodiments are possible.

15 Claims, 19 Drawing Sheets

VEHICLE OWNER

OTHERS

(51) Int. Cl.
  *B60R 25/102* (2013.01)
  *B60R 25/24* (2013.01)
  *H04L 9/40* (2022.01)
  *H04W 68/00* (2009.01)
  *H04W 4/80* (2018.01)
  *H04W 92/18* (2009.01)

(52) U.S. Cl.
  CPC ........... *H04W 4/44* (2018.02); *H04W 68/005* (2013.01); *H04W 4/80* (2018.02); *H04W 92/18* (2013.01)

(56) References Cited

U.S. PATENT DOCUMENTS

| | | | | |
|---|---|---|---|---|
| 9,365,188 | B1* | 6/2016 | Penilla | G06Q 10/02 |
| 9,688,247 | B1* | 6/2017 | Jayaraman | H04L 9/088 |
| 10,198,685 | B2* | 2/2019 | Simon | B66F 17/003 |
| 10,339,739 | B2* | 7/2019 | Mala | G06F 16/2455 |
| 2007/0093215 | A1* | 4/2007 | Mervine | G07F 17/0057 455/99 |
| 2011/0112969 | A1 | 5/2011 | Zaid et al. | |
| 2013/0285792 | A1* | 10/2013 | Shimizu | G08C 19/00 340/5.6 |
| 2013/0297100 | A1* | 11/2013 | Petersen | G06F 17/00 701/2 |
| 2015/0156058 | A1* | 6/2015 | Uefuji | H04L 41/046 709/223 |
| 2015/0363986 | A1* | 12/2015 | Hoyos | H04W 4/40 340/5.61 |
| 2016/0140649 | A1* | 5/2016 | Kleve | H04W 12/04 705/307 |
| 2016/0297398 | A1 | 10/2016 | Jefferies et al. | |
| 2016/0371902 | A1* | 12/2016 | Sitarski | B60R 25/24 |

FOREIGN PATENT DOCUMENTS

| | | |
|---|---|---|
| KR | 10-2010-0024715 A | 3/2010 |
| KR | 10-1232640 B1 | 2/2013 |
| KR | 10-2013-0038438 A | 4/2013 |

\* cited by examiner

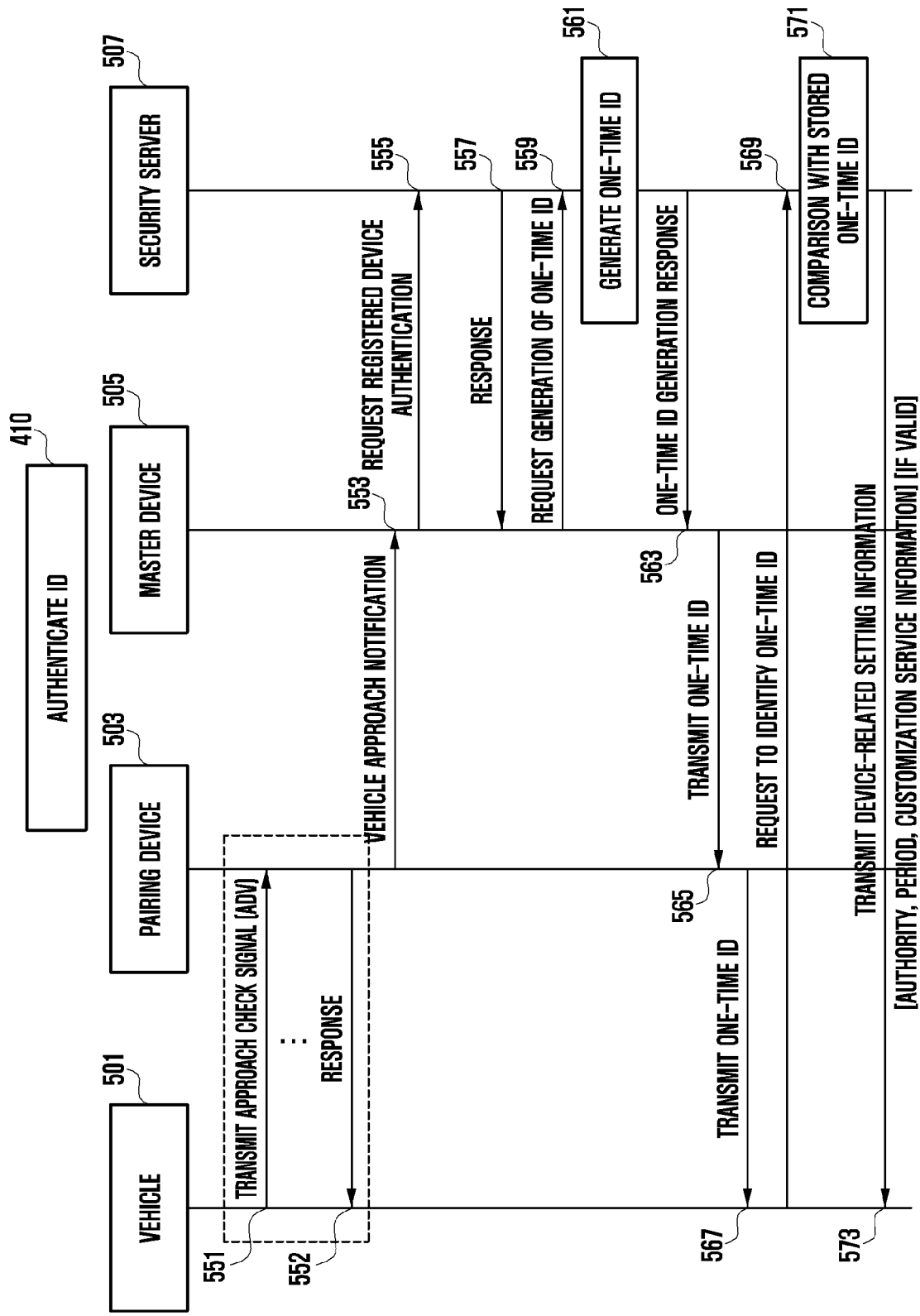

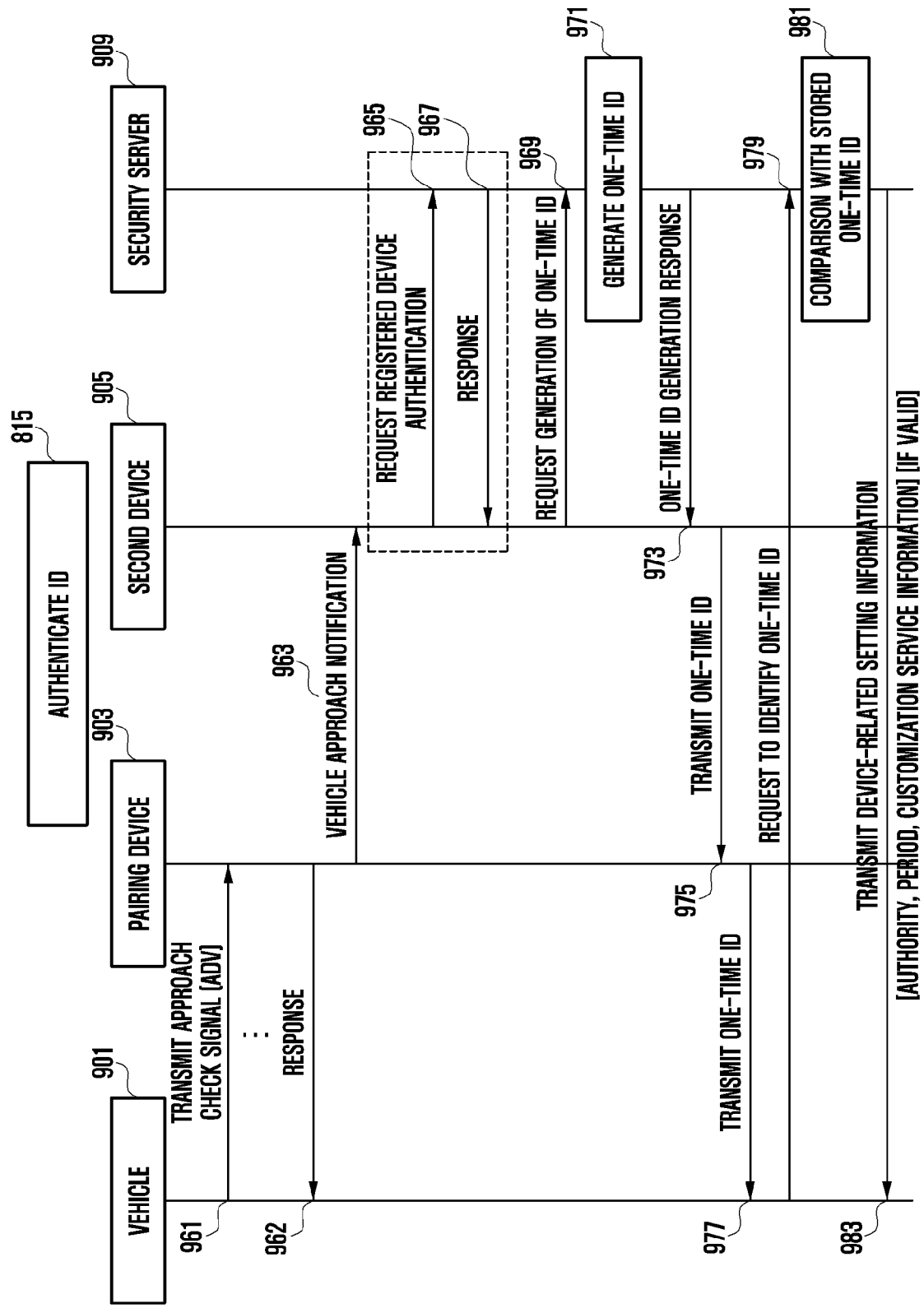

METHOD AND DEVICE FOR SETTING CUSTOMIZED FUNCTION BY MEANS OF SMART KEY FOR VEHICLES

CROSS-REFERENCE TO RELATED APPLICATIONS

This application is a 371 National Stage of International Application No. PCT/KR2018/001406, filed Feb. 1, 2018, which claims priority to Korean Patent Application No. 10-2017-0019390, filed Feb. 13, 2017, the disclosures of which are herein incorporated by reference in their entirety.

BACKGROUND

1. Field

The disclosure relates to a method and apparatus for setting a function customized for each user in a vehicle using a smart key.

2. Description of Related Art

In order to satisfy a wireless data traffic demand that tends to increases after the 4th-generation (4G) communication system commercialization, efforts to develop an improved 5 (5G) communication system or pre-5G communication system is being made. For this reason, the 5G communication system or pre-5G communication system is called a beyond 4G network communication system or a post LTE system. In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

As the data communication technology is advanced, the supply of smart keys capable of controlling the operation of a device to be controlled by only a signal without a physical contact with the device to be controlled is spread. For example, the use of a smart key for controlling a vehicle is gradually increasing.

The door lock/unlock, power on/off, etc. of a vehicle may be controlled using a smart key. According to a conventional technology, a smart key for a driver is allocated to one vehicle. Accordingly, in order for various persons to drive the vehicle, the corresponding smart key must be shared. Accordingly, a problem may occur in security and safety because a person who owned the smart key may use all functions related to the vehicle.

SUMMARY

The disclosure provides a method capable of recognizing the user of a vehicle smart key and providing a function customized for each user.

Solution to Problem

According to an embodiment of the disclosure, a method of an electronic device includes registering user information and user customization setting information with a security server, detecting a relevant vehicle, and performing authentication on the security server using the user information based on the relevant vehicle being detected. The user customization setting information registered with the security server may be forwarded to the relevant vehicle based on the authentication being valid.

According to an embodiment of the disclosure, a method of a security server may include registering user information and user customization setting information obtained from an electronic device, performing authentication on the user information transmitted by the electronic device based on a relevant vehicle being detected, and forwarding the registered user customization setting information to the relevant vehicle based on the authentication being valid.

According to an embodiment of the disclosure, an electronic device includes a transceiver transmitting and receiving signals and a controller configured to control to register user information and user customization setting information with a security server, detect a relevant vehicle, and perform authentication on the security server using the user information based on the relevant vehicle being detected. The user customization setting information registered with the security server may be forwarded to the relevant vehicle based on the authentication being valid.

According to an embodiment of the disclosure, a security server may include a transceiver transmitting and receiving signals, a storage unit, and a controller configured to control to register user information and user customization setting information obtained from an electronic device, perform authentication on the user information transmitted by the electronic device based on a relevant vehicle being detected, and forward the registered user customization setting information to the relevant vehicle based on the authentication being valid.

In accordance with an embodiment of the disclosure, service customized for each user is possible because a user is recognized based on a smart key. If a short-term key is provided to others, a master user can control a function provided in relation to the short-term key.

Furthermore, according to various embodiments of the disclosure, a terminal not having a smart key function and a terminal not having a remote module can be used as a smart key through interoperation.

BRIEF DESCRIPTION OF THE DRAWINGS

FIG. 5C is a diagram showing an example of an authentication method if the pairing device of a master device is used as a smart key according to another embodiment of the disclosure.

FIG. 9D is a diagram showing an example of an authentication method if the pairing device of a second device is used as a smart key according to another embodiment of the disclosure.

DETAILED DESCRIPTION

Figure 1:
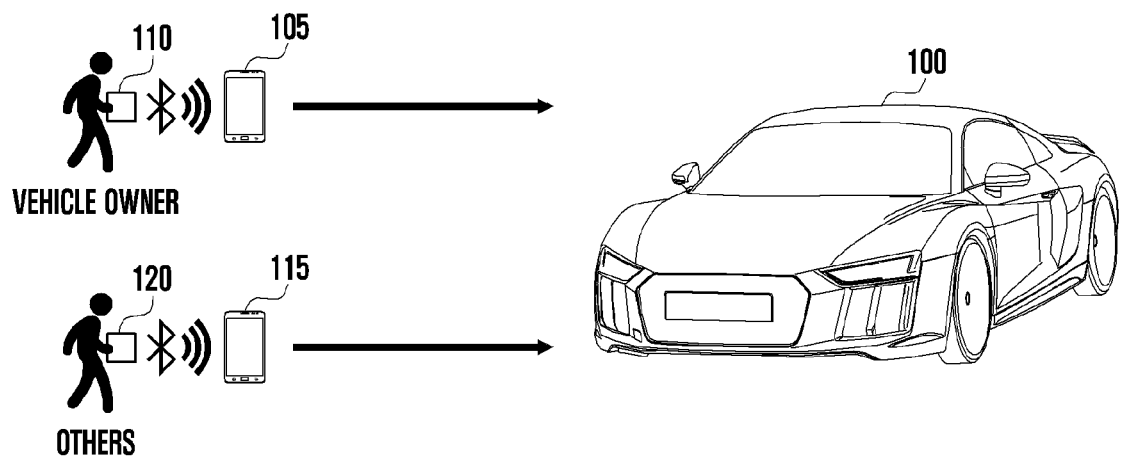
FIG. 1 is a diagram for illustrating control of a vehicle using a smart key according to various embodiments of the disclosure.

Hereinafter, the disclosure is described with reference to the accompanying drawings. Although specific embodiments of the disclosure are illustrated in the drawings and a related detailed description is given, the disclosure may be modified in various ways and the disclosure may have various embodiments. Accordingly, the disclosure is not intended to be limited to the specific embodiments, but it should be understood that the specific embodiments include all modifications, equivalents to substitutions that are included in the spirit and technological scope of the disclosure. In relation to a description of the drawings, similar reference numerals are used throughout the drawings to refer to similar elements.

Expressions, such as "include" and "may include" which may be used in the disclosure, indicate the existence of a disclosed corresponding function, operation or element, and do not limit one or more additional functions, operations or elements. Furthermore, it is to be understood that in the disclosure, a term, such as "include" or "have", is intended to indicate the existence of a characteristic, number, step, operation, element, or component or a combination of them in the specification and does not exclude the existence of one or more other characteristics, numbers, steps, operations, elements, or components or a combination of them or the possibility addition of them.

Furthermore, in the disclosure, an expression "and/or" includes any of words listed together and all combinations of the words. For example, A and/or B may include A, may include B, or may include both A and B.

Furthermore, in the disclosure, expressions, such as "the first", "the second", "first", and 'second", may indicate various elements of the disclosure, but do not limit corresponding elements. For example, the expressions do not limit order and/or importance of corresponding elements. The expressions may be used to distinguish one element from other elements. For example, a first user device and a second user device are all user devices and are different user devices. For example, a first element may be named a second element without departing from the range of right of the disclosure. Likewise, a second element may be named a first element.

When it is described that one element is "connected to" or "coupled" to" the other element, it should be understood that the one element may be directly connected or coupled to the other element, but a third element may be interposed between the two elements. In contrast, when it is described that one element is "directly connected to" or "directly coupled to" the other element, it should be understood that a third element is not interposed between the two elements.

Terms used in the disclosure are used to only describe specific embodiments and are not intended to restrict the disclosure. An expression of the singular number includes an expression of the plural number unless clearly defined otherwise in the context.

All terms used herein, including technical terms or scientific terms, have the same meanings as those commonly understood by a person having ordinary skill in the art to which the disclosure pertains, unless defined otherwise in the specification. Terms, such as those commonly used and defined in dictionaries, should be construed as having the same meanings as those in the context of a related technology, and should not be construed as having ideal or excessively formal meanings unless explicitly defined otherwise in the specification.

FIG. 1 is a diagram for illustrating control of a vehicle using a smart key according to various embodiments of the disclosure.

According to various embodiments of the disclosure, one vehicle 100 may be used by various users. For example, if a user's terminal supporting remote communication supports a smart key function, each user may register each terminal as a smart key and use the terminal.

For example, a vehicle owner may register a master device 105 as a smart key for a vehicle 100 and use the master device. In this case, if the master device 105 capable of remote communication does not support a smart key function, it may be paired with a pairing device 110 supporting a smart key function, the master device may be registered as a smart key and used.

Others not a vehicle owner may register their own terminals capable of remote communication, for example, a second device 115 as a smart key for the vehicle 100, and may use second device. In this case, the registration of the second device 115 may be performed through the master device 105 of the vehicle owner. If the second device 115 capable of remote communication does not support a smart key function, it may be paired with a pairing device 120 supporting a smart key function, and may be registered as a smart key and used.

According to various embodiments of the disclosure, when each smart key is registered, user customization setting information corresponding to each smart key may be registered.

The user customization setting information may include at least one of vehicle function restriction information, user group information, vehicle state customization setting information, or smart key deactivation information, for example. The vehicle function restriction information is to restrict some of the functions of a vehicle, and may restrict an authority for start-up or permit only a door lock/unlock function. The user group information may provide notification that a corresponding device belongs to which user group if a user group having the same customization setting information is designated. The vehicle state customization setting information may provide a seat location for each user, the location of a side-view mirror, volume, etc. in a customized manner. The smart key deactivation information may restrict a condition, such as a time interval or place in which a vehicle may be controlled using a corresponding smart key.

Figure 2:
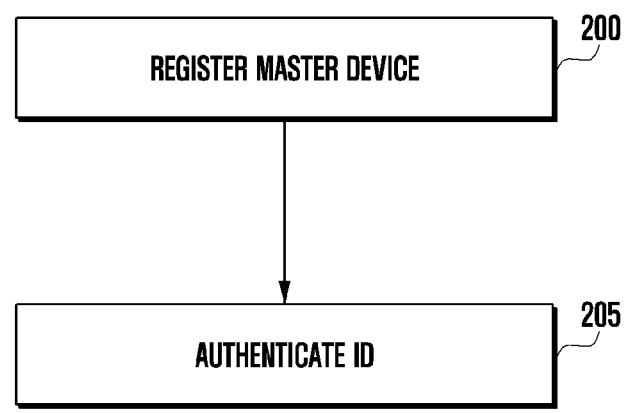
FIG. 2 is a diagram showing an operation if a master device is used as a smart key according to an embodiment of the disclosure.

FIG. 2 is a diagram showing an operation if a master device is used as a smart key according to an embodiment of the disclosure.

At step 200, first, the master device may be registered with a security server. The security server includes an electronic device for storing smart key-related information related to a vehicle and performs authentication between a smart key and the vehicle.

At step 205, when the master device approaches the vehicle, for example, when the vehicle is detected by the master device, the master device maybe authenticated, and user customization setting information corresponding to the corresponding master device may be provided to the vehicle.

Figure 3A:
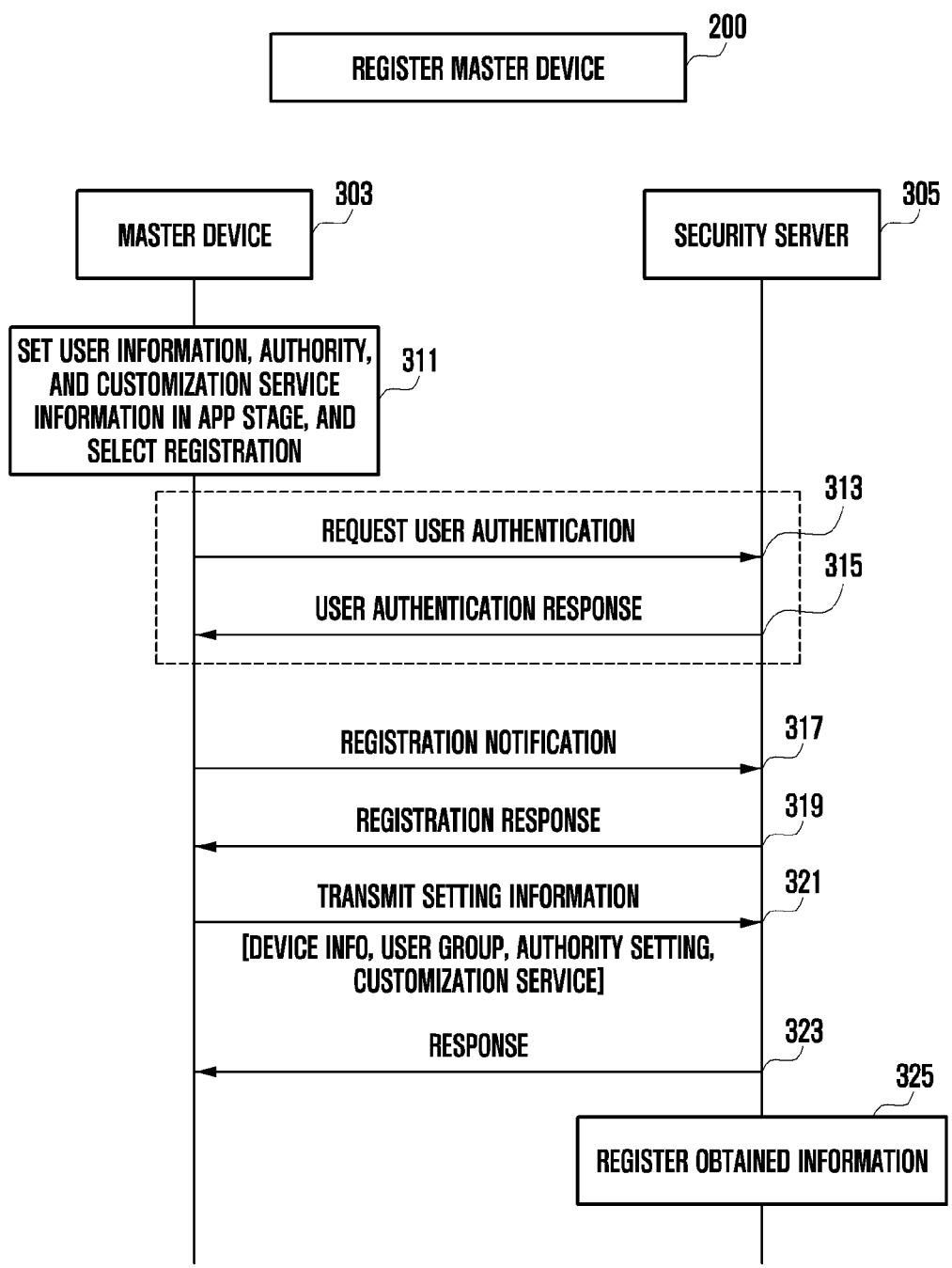
FIG. 3A is a diagram showing an example of a device registration method if a master device is used as a smart key according to an embodiment of the disclosure.

FIG. 3A is a diagram showing an example of a device registration method (e.g., step 200) if a master device is used as a smart key according to an embodiment of the disclosure.

At step 311, a master device 303 may set user information and user customization setting information in an application stage, and may select that it will be registered with a security server 305. The user information may include ID information of the master device, for example.

Thereafter, the master device 303 may perform user authentication for device registration. For example, the master device 303 may request user authentication from the security server 305 at step 313, and may obtain user authentication response from the security server 305 at step 315.

The master device 303 may transmit registration notification to the security server 305 in order to provide notification that user registration will be performed at step 317, and may obtain a registration response from the security server 305 at step 319.

Thereafter, the master device 303 may transmit user customization setting information to the security server 305 at step 321, and may obtain a response from the security server 305 at step 323. The security server 305 may perform the registration of the obtained user customization setting information at step 325.

Figure 3B:
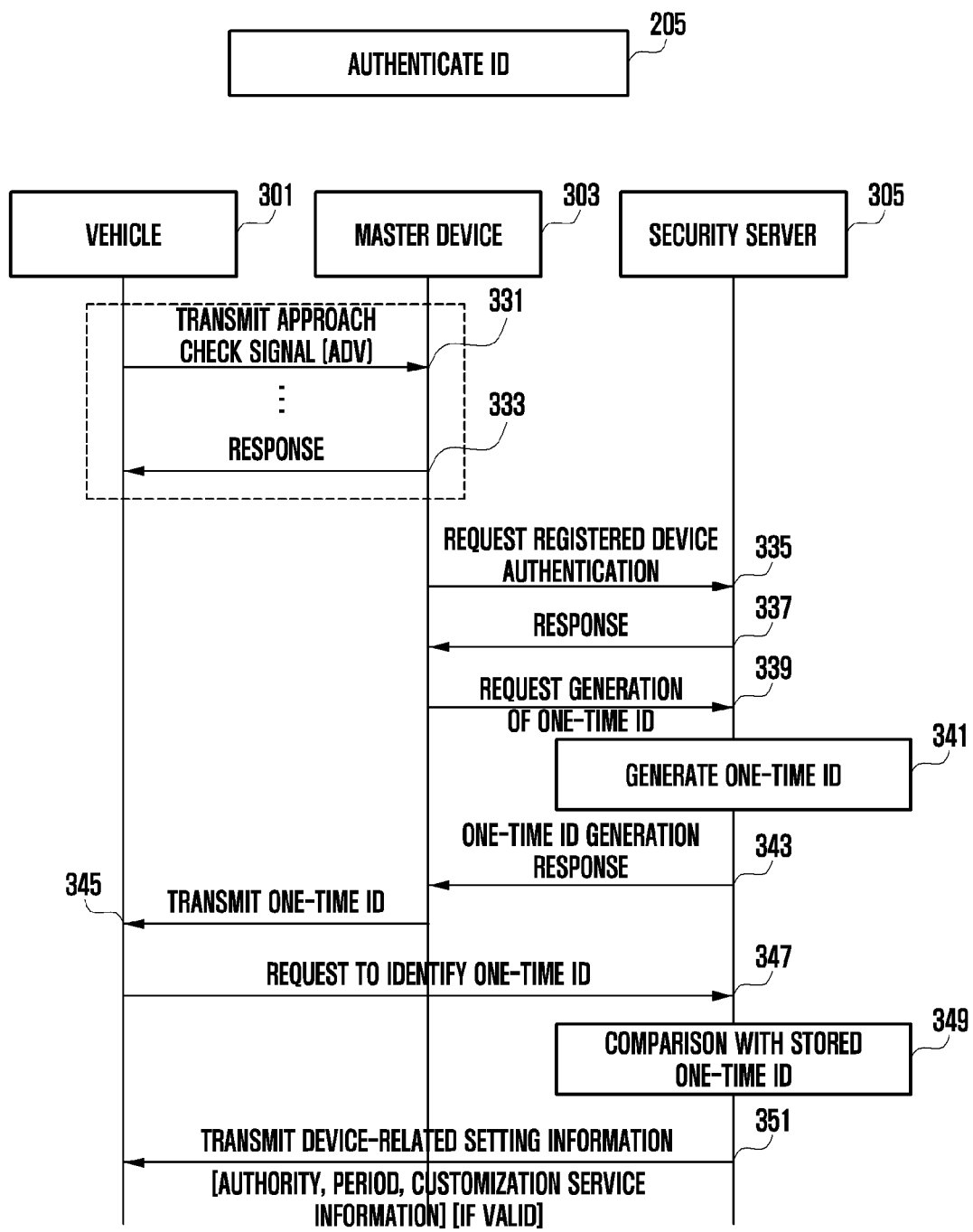
FIG. 3B is a diagram showing an example of an authentication method if a master device is used as a smart key according to an embodiment of the disclosure.

FIG. 3B is a diagram showing an example of an authentication method (e.g., step 205) if a master device is used as a smart key according to an embodiment of the disclosure.

A vehicle 301 and a master device 303 may check whether they are approaching. For example, the vehicle 301 may transmit an approach check signal (Adv) continuously (e.g., periodically) as in step 331. When the approach check signal (Adv) is detected, the master device 303 may transmit a response thereto to the vehicle 301 at step 333. In this case, the response may include user information of the master device. If the response includes the user information, a problem may occur in security. Accordingly, according to an embodiment of the disclosure, the temporary ID of the master device may be generated through a security server 305, and authentication may be performed between the vehicle 301 and the master device 303 based on the temporary ID.

For example, when the vehicle is detected (e.g., when the approach check signal is detected), the master device 303 may transmit user information to the security server 305 and request registered device authentication at step 335, and may obtain a response at step 337. For example, the master device may obtain the response only if the user information has been registered with the security server 305.

The master device 303 that has obtained the response may request the generation of a one-time identifier (ID) for the master device from the security server 305 at step 339. The security server 305 may generate a one-time ID at step 341, and may transmit it to the master device 303 at step 343. The master device 303 may forward the obtained one-time ID to the vehicle 301 at step 345.

Thereafter, at step 347, the vehicle 301 may request the security server 305 to identify whether the obtained one-time ID is identical with a one-time ID stored in the security server. That is, whether the master device has been registered as a smart key may be authenticated. The security server 305 may identify whether the one-time ID transmitted by the vehicle 301 is identical with the stored ID at step 349. If it is identified that the one-time ID is identical with the stored ID, the security server may transmit, to the vehicle 301, user customization setting information related to the corresponding master device at step 351.

The vehicle 301 may set user customization setting information in accordance with the one-time ID. Control of the vehicle by the master device may follow the setting.

Figure 4:
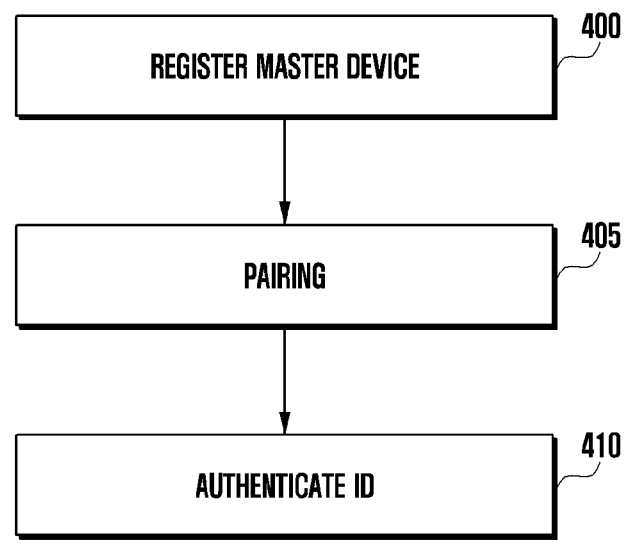
FIG. 4 is a diagram showing an operation if the pairing device of a master device is used as a smart key according to another embodiment of the disclosure.

FIG. 4 is a diagram showing an operation if the pairing device of a master device is used as a smart key according to another embodiment of the disclosure.

At step 400, first, a master device may be registered with a security server. The security server includes an electronic device for storing smart key-related information related to a vehicle and performing authentication between the smart key and the vehicle.

At step 405, pairing between the master device and a pairing device may be performed using short-distance communication. Accordingly, the pairing device and the master device include a short-distance communication module, such as Bluetooth or NFC. The pairing device providing a smart key function may operate as the smart key for the vehicle, and the pairing device may exchange signals with the security server through the master device.

At step 410, when the pairing device approaches the vehicle, for example, when the vehicle is detected by the pairing device, user customization setting information corresponding to a corresponding user may be provided to the vehicle by performing authentication through the master device.

Figure 5A:
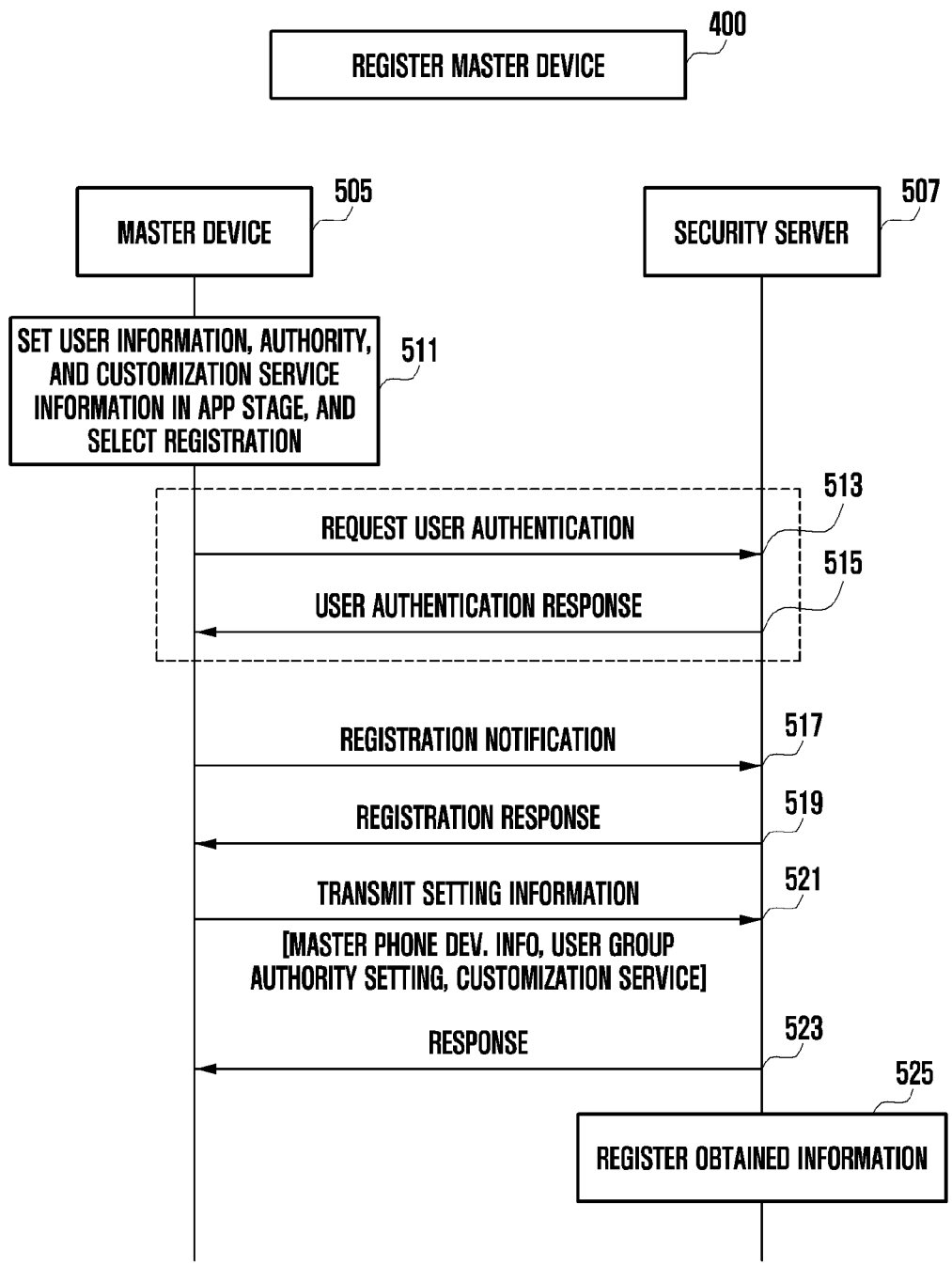
FIG. 5A is a diagram showing an example of a device registration method if the pairing device of a master device is used as a smart key according to another embodiment of the disclosure.

FIG. 5A is a diagram showing an example of a device registration method (e.g., step 400) if the pairing device of a master device is used as a smart key according to another embodiment of the disclosure.

At step 511, a master device 505 may set user information and user customization setting information in an application stage, and may select that it will be registered with a security server 507. The user information may include ID information of the master device, for example.

Thereafter, the master device 505 may perform user authentication for device registration. For example, the master device 505 may request user authentication from the security server 507 at step 513, and may obtain user authentication response from the security server 507 at step 515.

The master device 505 may transmit registration notification to the security server 507 in order to provide notification that the master device will perform user registration at step 517, and may obtain a registration response from the security server 507 at step 519.

Thereafter, the master device 505 may transmit user customization setting information to the security server 507 at step 521, and may obtain a response from the security server 507 at step 523. The security server 507 may perform the registration of the obtained user customization setting information at step 525.

Figure 5B:
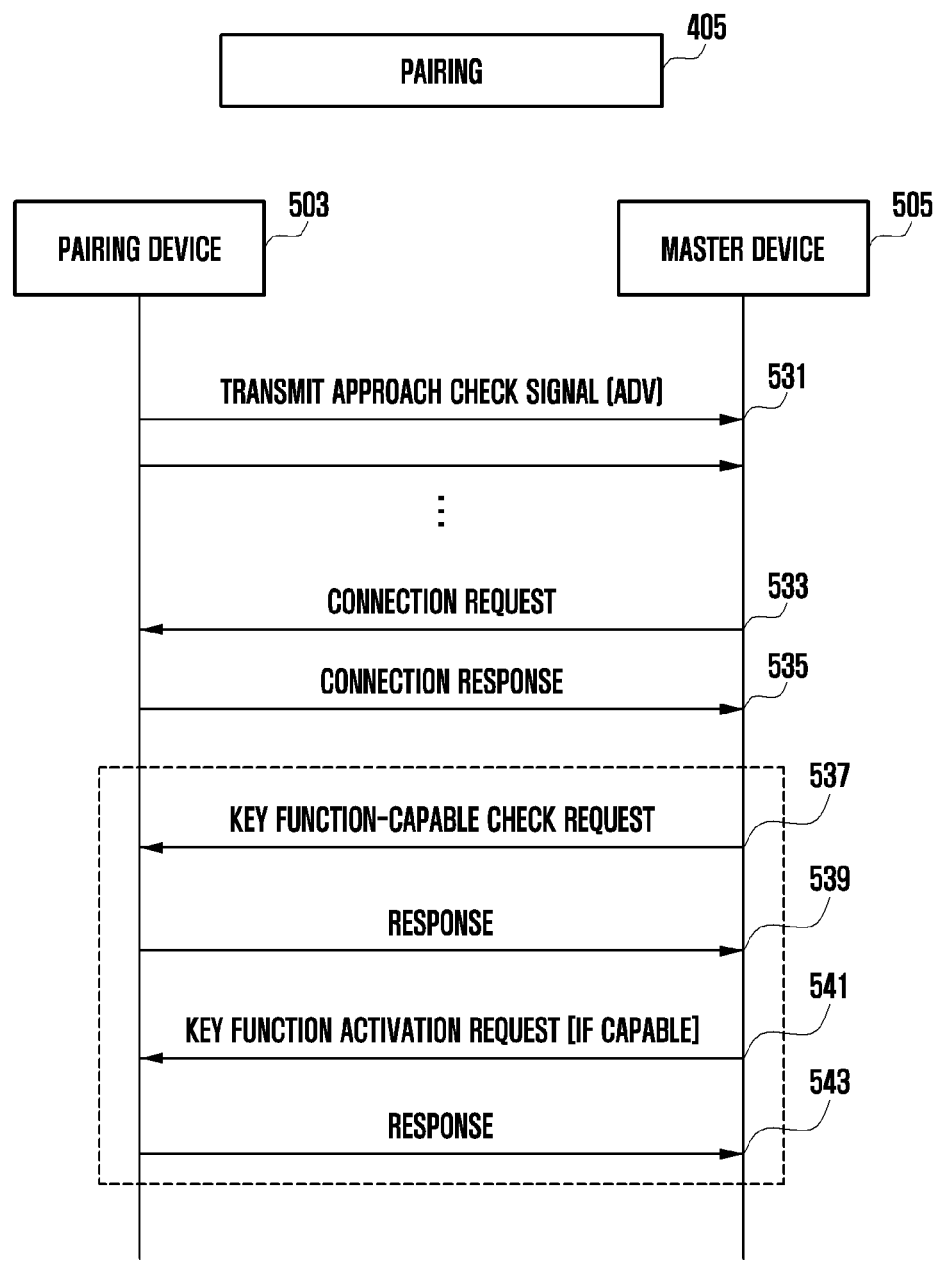
FIG. 5B is a diagram showing an example of a pairing method if the pairing device of a master device is used as a smart key according to another embodiment of the disclosure.

FIG. 5B is a diagram showing an example of a pairing method (e.g., step 405) if the pairing device of a master device is used as a smart key according to another embodiment of the disclosure.

A pairing device 503 may transmit an approach check signal (Adv) at step 531. For example, the pairing device may transmit the approach check signal (Adv) periodically. When the master device 505 detects the approach check signal (Adv), it may transmit a connection request to the pairing device 503 at step 533, and may obtain a connection response from the pairing device 503 at step 535.

When the connection response is obtained, the master device 505 may activate the smart key function of the pairing device 503. For example, the master device 505 may transmit a key function-capable check request to the pairing device 503 in order to identify whether the pairing device 503 may provide a smart key function at step 537, and may obtain a response at step 539.

When the pairing device 503 receives a response indicating that the smart key function may be provided, the master device 505 may transmit a smart key function activation request to the pairing device 503 at step 541, and may obtain a response at step 543.

FIG. 5C is a diagram showing an example of an authentication method (e.g., step 410) if the pairing device of a master device is used as a smart key according to another embodiment of the disclosure.

A vehicle 501 and a pairing device 503 may check whether they approach each other. For example, as in step 551, the vehicle 501 may transmit an approach check signal (Adv) continuously (e.g., periodically). When the approach check signal (Adv) is detected, the pairing device 503 may transmit a response thereto to the vehicle 501 at step 552. In this case, the response may include user information of a master device. If the response includes the user information, a problem may occur in security. Accordingly, according to an embodiment of the disclosure, the temporary ID of the master device may be generated through the security server 507, and authentication may be performed between the vehicle 501 and the master device 505 based on the temporary ID.

When the vehicle 501 is detected, that is, when a response is obtained from the vehicle 501, the pairing device 503 may notify the master device 505 of the response. That is, the pairing device 503 may forward vehicle approach notification to the master device 505 at step 553.

When the vehicle is detected (e.g., when the vehicle approach notification is detected), the master device 505 may transmit user information to a security server 507 and request registered device authentication at step 555, and may obtain a response at step 557. For example, the master device may obtain the response only if the user information has been registered with the security server 507.

The master device 505 that has obtained the response may request the generation of a one-time ID for the master device from the security server 507 at step 559. The security server 507 may generate a one-time ID at step 561, and may transmit it to the master device 505 at step 563. The master device 505 may forward the obtained one-time ID to the pairing device 503 at step 565. Furthermore, the pairing device 503 may forward the obtained one-time ID to the vehicle 501 at step 567.

Thereafter, at step 569, the vehicle 301 may request the security server 507 to identify whether the obtained one-time ID is identical with a one-time ID stored in the security server. That is, whether the master device has been registered as a smart key may be authenticated. The security server 507 may identify whether the one-time ID transmitted by the vehicle 501 is identical with the stored ID at step 571. If it is identified that the one-time ID is identical with the stored ID, the security server may transmit, to the vehicle 501, user customization setting information related to the corresponding master device at step 573.

The vehicle 501 may set the user customization setting information in accordance with the one-time ID, and control of the vehicle by the pairing device paired with the master device may follow the setting.

Figure 6:
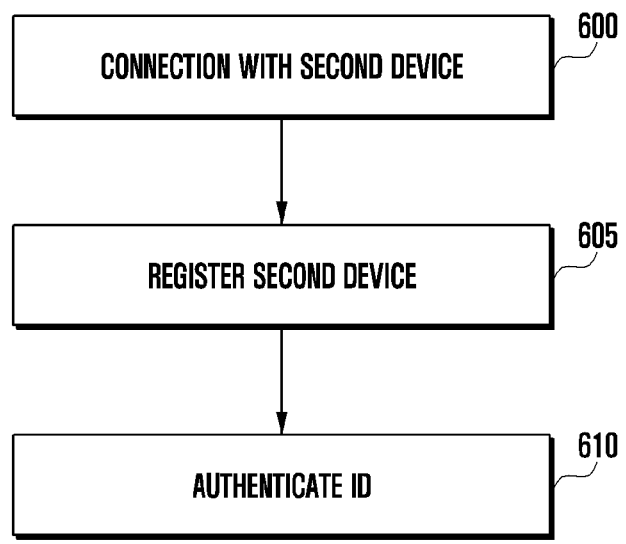
FIG. 6 is a diagram showing an operation if a second device is used as a smart key according to another embodiment of the disclosure.

FIG. 6 is a diagram showing an operation if a second device is used as a smart key according to another embodiment of the disclosure.

At step 600, if a smart key authority for a vehicle is to be assigned to a second device owned by others not a vehicle owner, the second device may be connected to a master device owned by the vehicle owner. That is, the master device may obtain user information of the second device. The user information of the second device may include ID information of the second device.

At step 605, the second device may be registered with a security server using the master device. The security server includes an electronic device for storing smart key-related information related to the vehicle and performing authentication between a smart key and the vehicle.

At step 610, when the second device approaches the vehicle, for example, when the vehicle is detected by the second device, the second device may be authenticated, and user customization setting information corresponding to the corresponding second device may be provided to the vehicle.

Figure 7A:
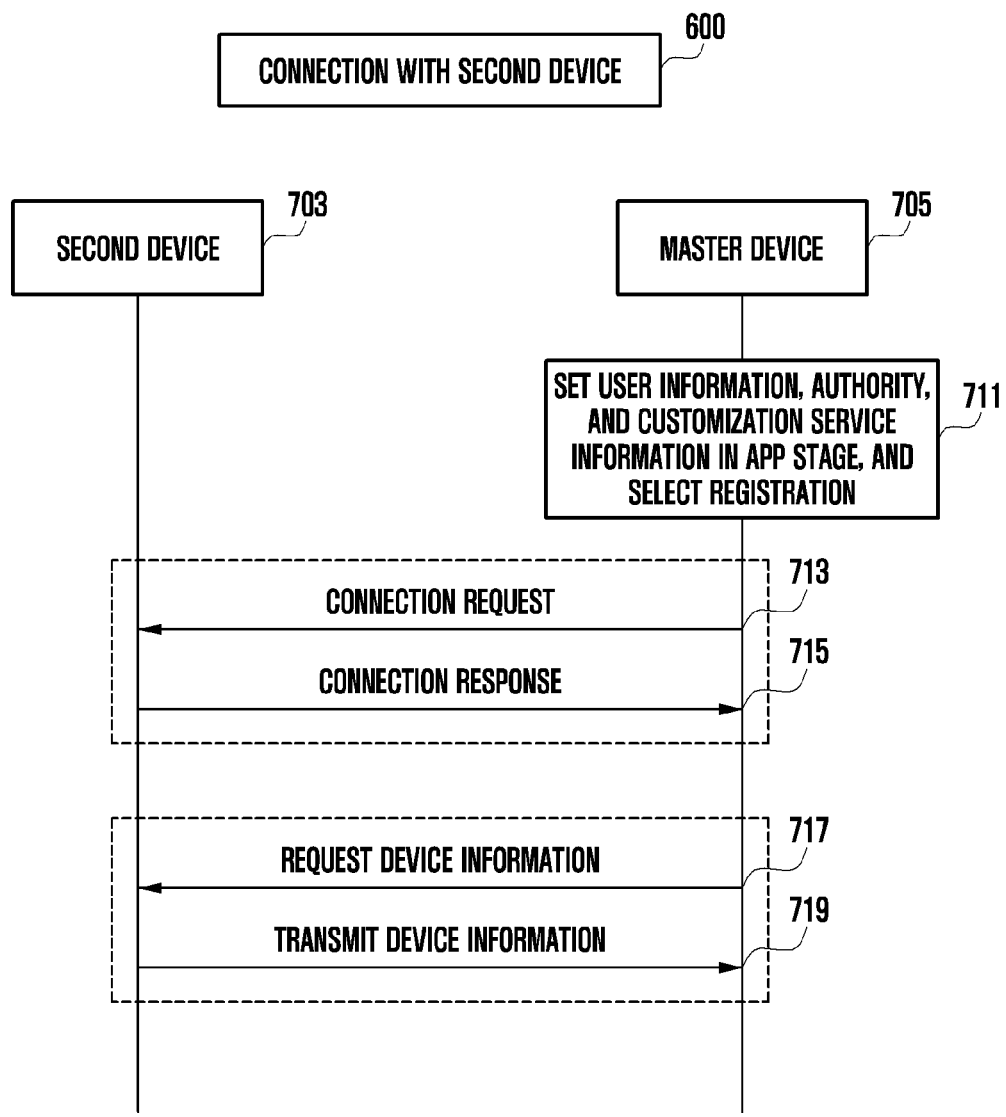
FIG. 7A is a diagram showing an example of a device connection method if a second device is used as a smart key according to an embodiment of the disclosure the smart key.

FIG. 7A is a diagram showing an example of a device connection method (e.g., step 600) if a second device is used as a smart key according to an embodiment of the disclosure the smart key.

At step 711, a master device 705 may set user information and user customization setting information in an application stage, and may select that it will be registered with a security server 707.

Thereafter, the master device 705 may perform a connection with a second device 703. For example, the master device 705 may request a connection from the second device 703 at step 713, and may obtain a connection response at step 715.

When the connection is completed, the master device 705 may request device information from the second device 703 at step 717, and may obtain the device information at step 719. The device information may include user information of the second device 703, for example.

Figure 7B:
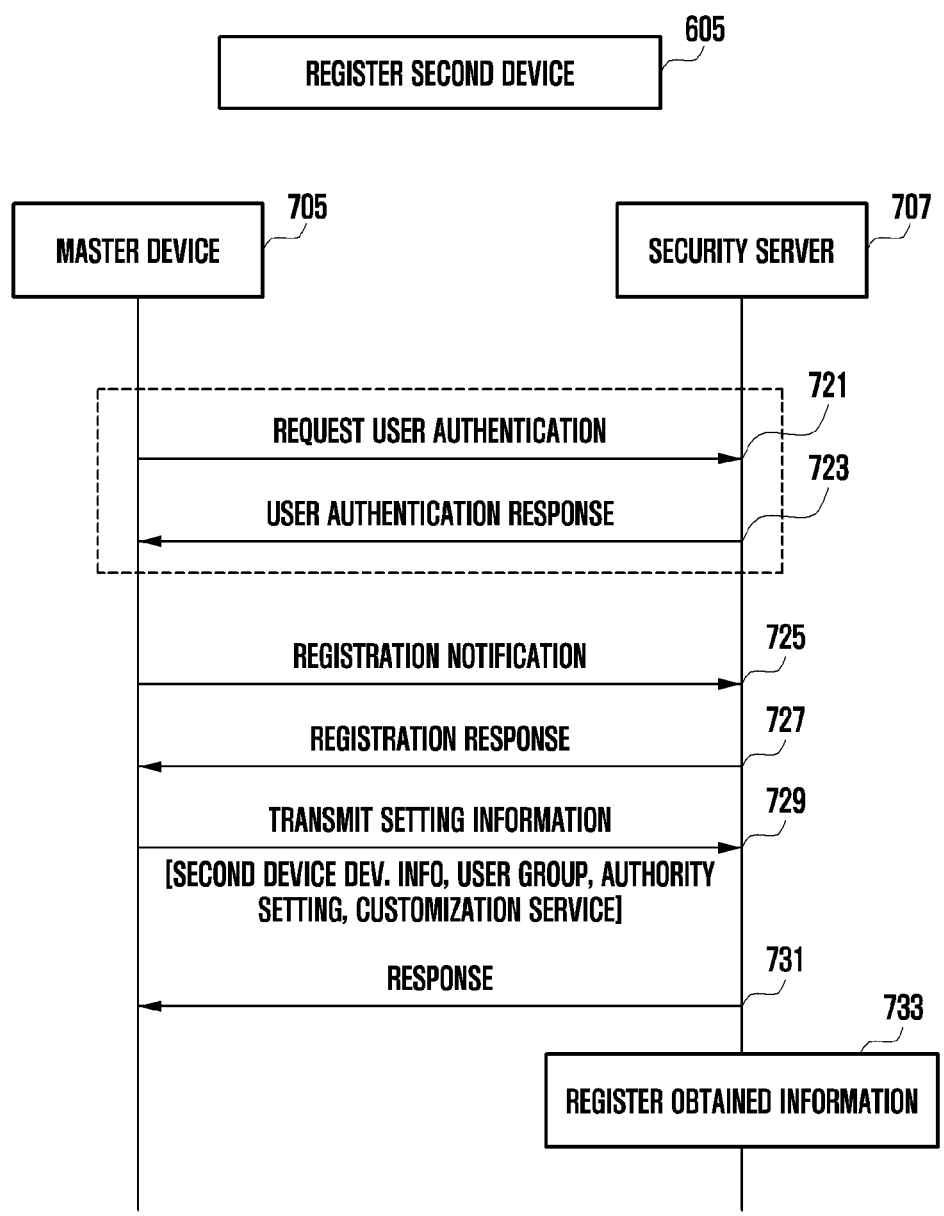
FIG. 7B is a diagram showing an example of a device registration method if a second device is used as a smart key according to an embodiment of the disclosure the smart key.

FIG. 7B is a diagram showing an example of a device registration method (step 605) if a second device is used as a smart key according to an embodiment of the disclosure the smart key.

A master device 705 may perform user authentication for device registration. For example, the master device 705 may request user authentication from a security server 707 at step 721, and may obtain user authentication response from the security server 707 at step 723.

The master device 705 may transmit registration notification to the security server 707 in order to provide notification that it will perform user registration at step 725, and may obtain a registration response from the security server 707 at step 727.

Thereafter, the master device 705 may transmit user information and user customization setting information of the second device to the security server 707 at step 729, and may obtain a response from the security server 707 at step 731. The security server 707 may perform the registration of the obtained user information and user customization setting information of the second device at step 733.

Figure 7C:
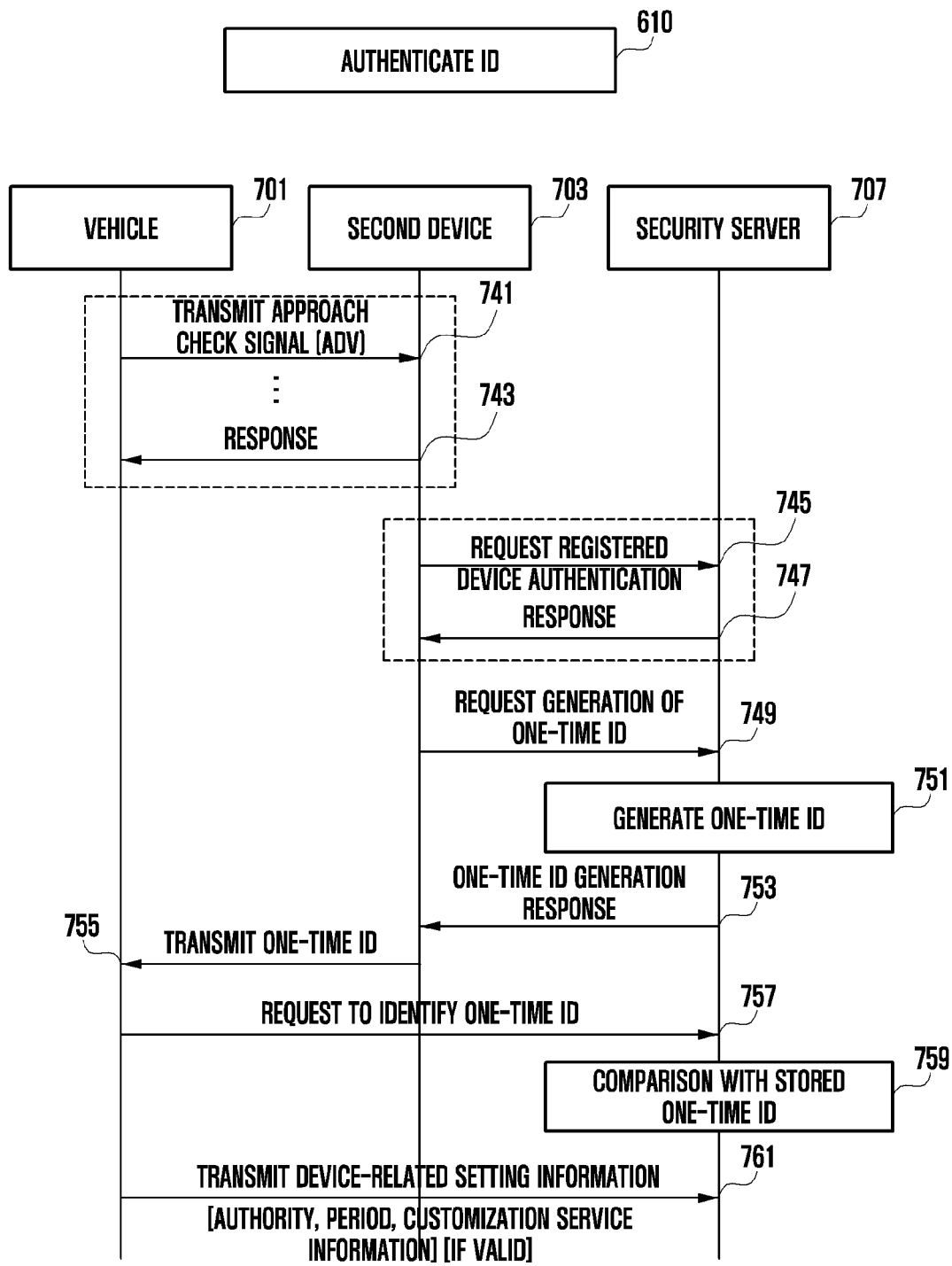
FIG. 7C is a diagram showing an example of an authentication method if a second device is used as a smart key according to an embodiment of the disclosure the smart key.

FIG. 7C is a diagram showing an example of an authentication method (e.g., step 610) if a second device is used as a smart key according to an embodiment of the disclosure the smart key.

A vehicle 701 and a second device 703 may check whether they approach each other. For example, the vehicle 701 may transmit an approach check signal (Adv) continuously (e.g., periodically) as in step 741. When the approach check signal (Adv) is detected, the second device 703 may transmit a response thereto to the vehicle 701 at step 743. In this case, the response may include user information of the second device. If the response includes the user information, a problem may occur in security. Accordingly, according to an embodiment of the disclosure, the temporary ID of the second device may be generated through a security server 707. Authentication may be performed between the vehicle 701 and the second device 703 based on the temporary ID.

For example, when the vehicle is detected (e.g., when the approach check signal is detected), the second device 703 may transmit user information to the security server 707 and request registered device authentication at step 745, and may obtain a response at step 747. For example, the second device may obtain the response only if the user information has been registered with the security server 707.

The second device 703 that has received the response may request the generation of a one-time ID for the second device from the security server 707 at step 749. The security server 707 may generate a one-time ID at step 751, and may transmit it to the second device 703 at step 753. The second device 703 may forward the obtained one-time ID to the vehicle 701 at step 755.

Thereafter, the vehicle 701 may request the security server 707 to identify whether the obtained one-time ID is identical with a one-time ID stored in the security server at step 757. That is, whether the second device has been registered as a smart key may be authenticated. The security server 707 may identify whether the one-time ID transmitted by the vehicle 701 is identical with the stored ID at step 759. If it is identified that the one-time ID is identical with the stored ID, the security server may transmit, to the vehicle 701, user customization setting information related to the corresponding second device at step 761.

The vehicle 701 may set the user customization setting information in accordance with the one-time ID. Control of the vehicle by the second device may follow the setting.

Figure 8:
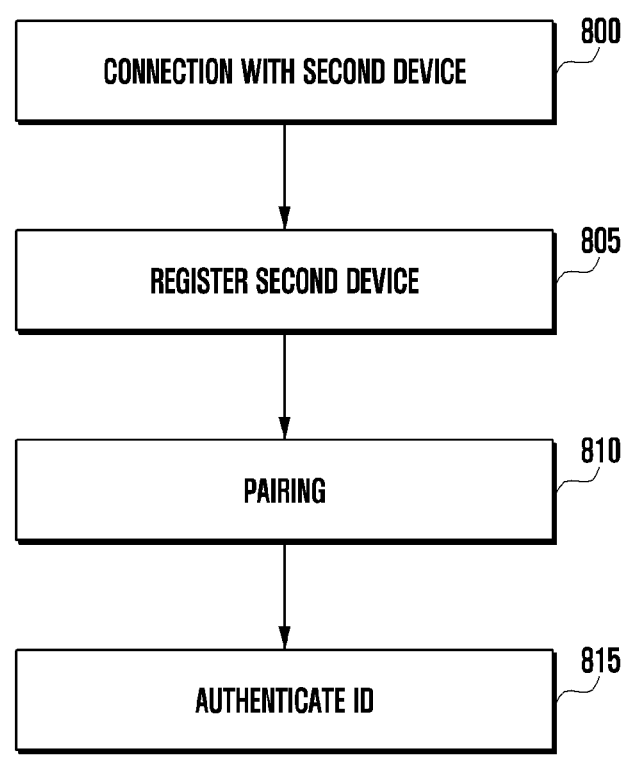
FIG. 8 is a diagram showing an operation if the pairing device of a second device is used as a smart key according to another embodiment of the disclosure.

FIG. 8 is a diagram showing an operation if the pairing device of a second device is used as a smart key according to another embodiment of the disclosure.

If a smart key authority for a vehicle is to be assigned to a second device owned by others not a vehicle owner, the second device may be connected to a master device owned by the vehicle owner at step 800. That is, the master device may obtain user information of the second device. The user information of the second device may include ID information of the second device.

At step 805, the second device may be registered with a security server. The security server includes an electronic device for storing smart key-related information related to the vehicle and performing authentication between a smart key and the vehicle.

At step 810, pairing between the second device and a pairing device may be performed using short-distance communication. Accordingly, the pairing device and the second device include a short-distance communication module, such as Bluetooth or NFC. The pairing device providing a smart key function may operate as a smart key for the vehicle, and the pairing device may exchange signals with the security server through the second device.

At step 815, when the pairing device approaches the vehicle, for example, when the vehicle is detected by the pairing device, user customization setting information corresponding to a corresponding user may be provided to the vehicle by performing authentication through the second device.

Figure 9A:
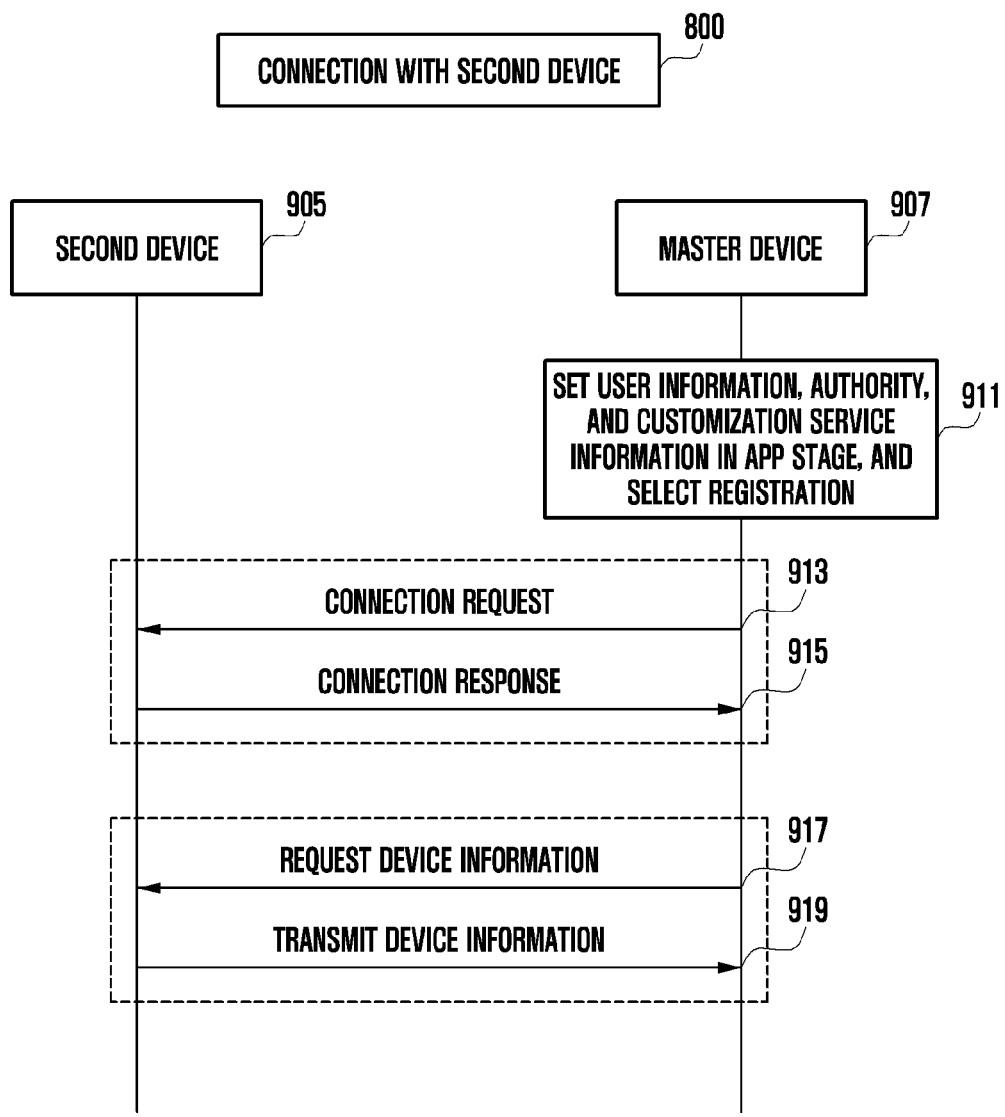
FIG. 9A is a diagram showing an example of a device connection method if the pairing device of a second device is used as a smart key according to an embodiment of the disclosure.

FIG. 9A is a diagram showing an example of a device connection method (e.g., step 800) if the pairing device of a second device is used as a smart key according to an embodiment of the disclosure.

A master device 907 may set user information and user customization setting information in an application stage, and may select that it will be registered with a security server 909 at step 911.

Thereafter, the master device 907 may perform a connection with the second device 905. For example, the master device 907 may request a connection from the second device 905 at step 913, and may obtain a connection response at step 915.

When the connection is completed, the master device 907 may request device information from the second device 905 at step 917, and may obtain the device information at step 919. The device information may include user information of the second device 905, for example.

Figure 9B:
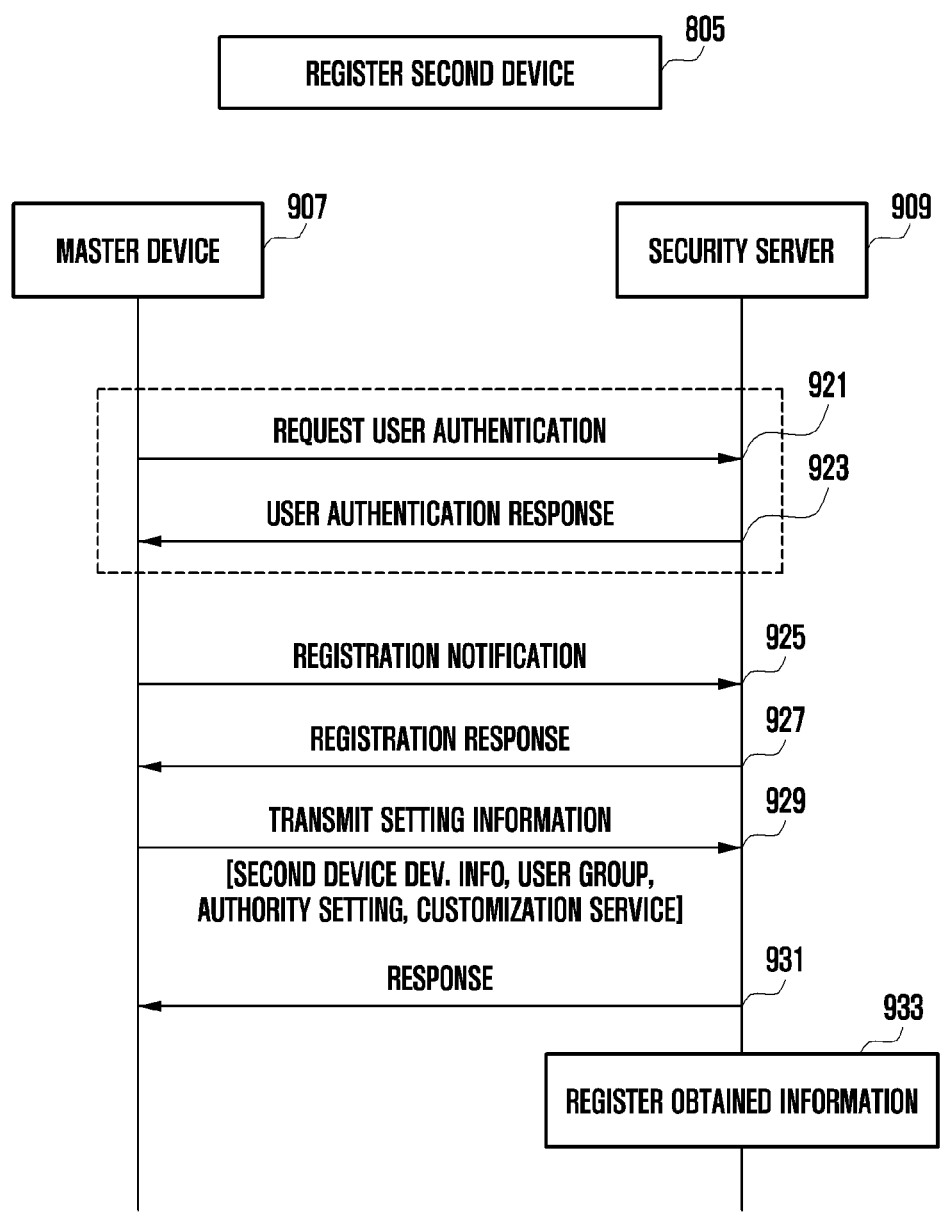
FIG. 9B is a diagram showing an example of a device registration method if the pairing device of a second device is used as a smart key according to another embodiment of the disclosure.

FIG. 9B is a diagram showing an example of a device registration method (e.g., step 805) if the pairing device of a second device is used as a smart key according to another embodiment of the disclosure.

A master device 907 may perform user authentication for device registration. For example, the master device 907 may request user authentication from a security server 909 at step 921, and may obtain user authentication response from the security server 909 at step 923.

The master device 907 may transmit registration notification to the security server 909 in order to provide notification that it will perform user registration at step 925, and may obtain a registration response from the security server 909 at step 927.

Thereafter, the master device 907 may transmit user information and user customization setting information of the second device to the security server 909 at step 929, and may obtain a response from the security server 909 at step 931. The security server 909 may perform the registration of the obtained user information and user customization setting information of the second device at step 933.

Figure 9C:
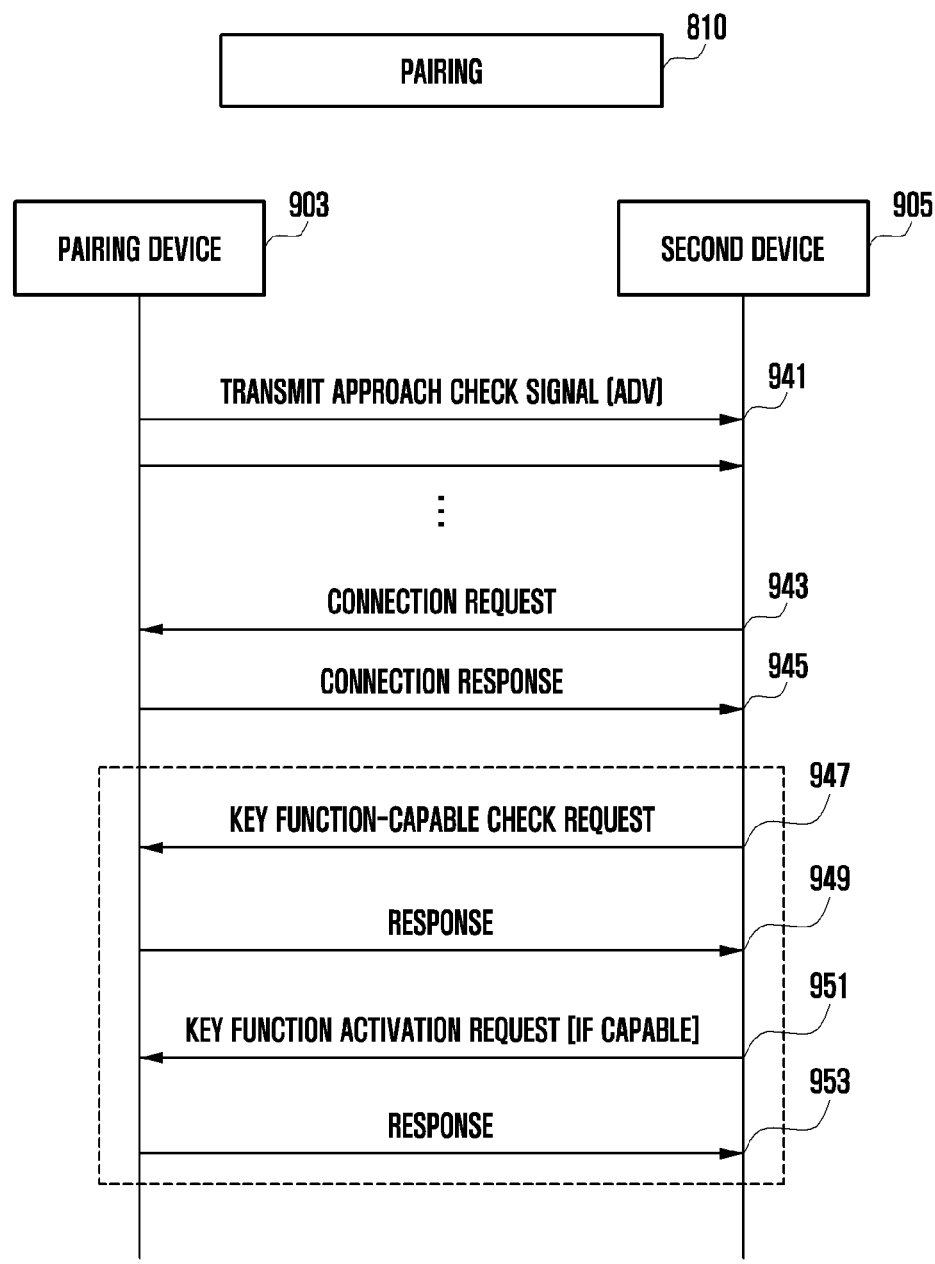
FIG. 9C is a diagram showing an example of a pairing method if the pairing device of a second device is used as a smart key according to another embodiment of the disclosure.

FIG. 9C is a diagram showing an example of a pairing method (e.g., step 810) if the pairing device of a second device is used as a smart key according to another embodiment of the disclosure.

A pairing device 903 may transmit an approach check signal (Adv) at step 941. For example, the pairing device may transmit the approach check signal (Adv) periodically. When the approach check signal (Adv) is detected, a second device 905 may transmit a connection request to the pairing device 903 at step 943, and may obtain a connection response from the pairing device 903 at step 945.

When the connection response is received, the second device 905 may activate the smart key function of the pairing device 903. For example, the second device 905 may transmit a key function-capable check request to the pairing device 903 in order to check whether the pairing device 903 may provide a smart key function at step 947, and may obtain a response at step 949.

When the pairing device 903 receives a response indicating that the smart key function may be provided, the second device 905 may transmit a smart key function activation request to the pairing device 903 at step 951, and may obtain a response at step 953.

FIG. 9D is a diagram showing an example of an authentication method (e.g., step 815) if the pairing device of a second device is used as a smart key according to another embodiment of the disclosure.

A vehicle 901 and a pairing device 903 may check whether they approach each other. For example, as in step 961, the vehicle 901 may transmit an approach check signal (Adv) continuously (e.g., periodically). When the approach check signal (Adv) is detected, the pairing device 903 may transmit a response thereto to the vehicle 901 at step 962. In this case, the response may include user information of a second device. If the response includes the user information, a problem may occur in security. Accordingly, according to an embodiment of the disclosure, the temporary ID of the second device may be generated through the security server 909. Authentication may be performed between the vehicle 901 and the second device 905 based on the temporary ID.

When the vehicle 901 is detected, that is, when the pairing device 903 receives a response from the vehicle 901, the pairing device may notify the second device 905 of the response. That is, the pairing device 903 may forward vehicle approach notification to the second device 905 at step 963.

When the vehicle is detected (e.g., when the vehicle approach notification is detected), the second device 905 may transmit user information to a security server 909 and request registered device authentication at step 965, and may obtain a response at step 967. For example, the second device may obtain the response only if the user information has been registered with the security server 909.

The second device 905 that has obtained the response may request the generation of a one-time ID for the second device from the security server 909 at step 969. The security server 909 may generate a one-time ID at step 971, and may transmit it to the second device 905 at step 973. The second device 905 may forward the obtained one-time ID to the pairing device 903 at step 975. Furthermore, the pairing device 903 may forward the obtained one-time ID to the vehicle 901 at step 977.

Thereafter, the vehicle 901 may request the security server 909 to identify whether the obtained one-time ID is identical with a one-time ID stored in the security server at step 979. That is, whether the second device has been registered as a smart key may be authenticated. The security server 909 may identify whether the one-time ID transmitted by the vehicle 901 is identical with the stored ID at step 981. If it is identified that the one-time ID is identical with the stored ID, the security server may transmit, to the vehicle 901, user customization setting information related to the corresponding second device at step 983.

The vehicle 901 may set the user customization setting information in accordance with the one-time ID. Control of the vehicle by the pairing device paired with the second device may follow the setting.

Figure 10:
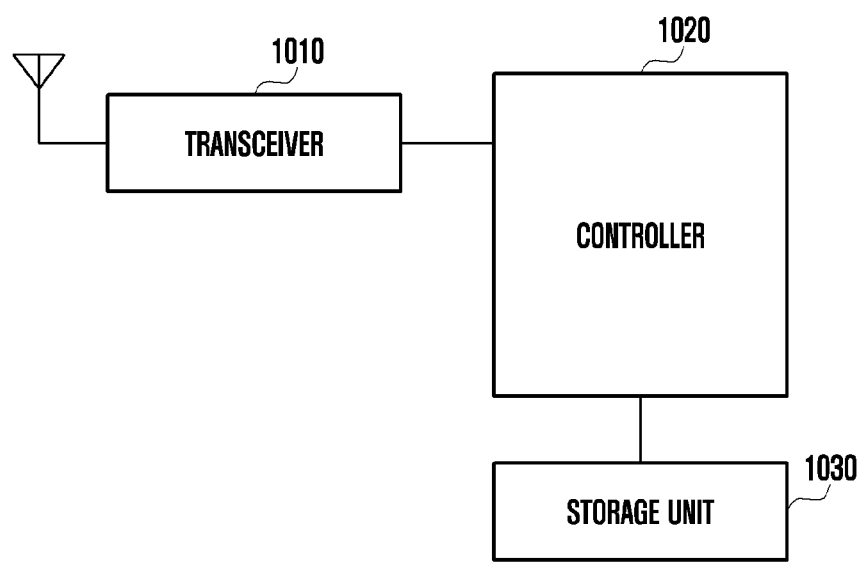
FIG. 10 is a diagram schematically showing the configuration of a smart key device (e.g., master device, second device or pairing device) according to an embodiment of the disclosure.

FIG. 10 is a diagram schematically showing the configuration of a smart key device (e.g., master device, second device or pairing device) according to an embodiment of the disclosure.

Referring to FIG. 10, the smart key device according to an embodiment of the disclosure may include a transceiver 1010, a controller 1020 and a storage unit 1030.

The transceiver 1010 may include, for example, an RF module for remote communication and a module for short-distance communication, for example, a Bluetooth module or an NFC module. The smart key device may transmit and receive signals to and from a vehicle and a security server using the RF module, and may transmit and receive signals to and from a pairing device using the module for short-distance communication.

The controller 1020 may include at least one processor. The controller 1020 may control the operations of the transceiver 1010 and the storage unit 1030. The controller 1020 may control the operations of the smart key device according to various embodiments of the disclosure, described with reference to FIGS. 2 to 9.

The storage unit 1030 may store user information and user customization setting information of the smart key device. Furthermore, the storage unit may store one-time ID information of the smart key device obtained from a security server. The user information may include ID information of the smart key device, for example. The user customization setting information may include at least one of vehicle function restriction information, user group information, vehicle state customization setting information, or smart key deactivation information, for example.

Figure 11:
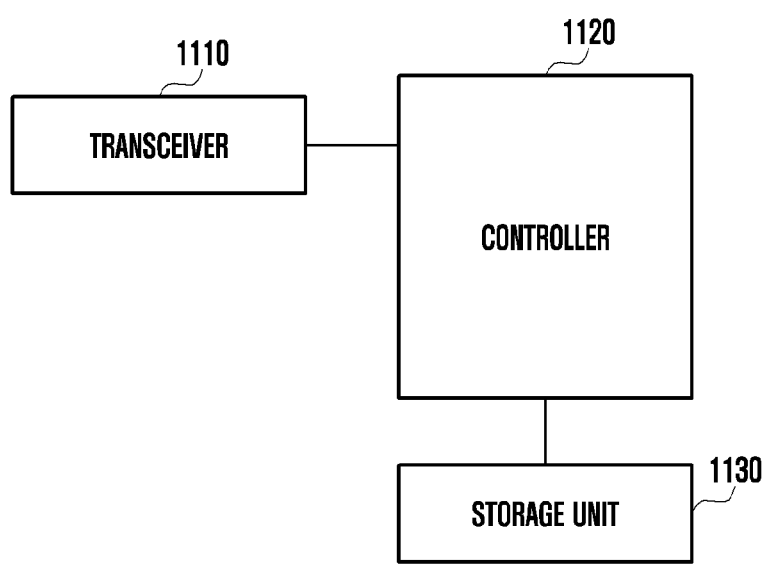
FIG. 11 is a diagram schematically showing the configuration of a security server according to an embodiment of the disclosure.

FIG. 11 is a diagram schematically showing the configuration of a security server according to an embodiment of the disclosure.

Referring to FIG. 11, the security server according to an embodiment of the disclosure may include a transceiver 1110, a controller 1120 and a storage unit 1130.

The transceiver 1110 may include a module for communication with a smart key device and a vehicle.

The controller 1120 may include at least one processor. The controller 1120 may control the operations of the transceiver 1110 and the storage unit 1130. The controller 1120 may control the operations of the security server according to various embodiments of the disclosure, described with reference to FIGS. 2 to 9.

The storage unit 1130 may store user information and user customization setting information of a smart key device. Furthermore, the storage unit may store one-time ID information of a smart key device generated by the security server.

Although not shown, the vehicle described in various embodiments of the disclosure may include a communication module for transmitting and receiving signals to and from a smart key device and a security server, at least one processor for controlling the operation of the vehicle, and a memory for storing data.

Each of the elements of the electronic device according to various embodiments of the disclosure may be configured with one or more components, and the name of a corresponding element may be different depending on the type of electronic device. The electronic device according to various embodiments of the disclosure may be configured to include at least one of the above-described elements, and some of the elements may be omitted or the electronic device may further include an additional element. Furthermore, some of the elements of the electronic device according to various embodiments may be combined to form a single entity, and may perform the same functions as corresponding elements before they are combined.

The term "~unit, "device" or "module" used in various embodiments of the disclosure may mean a unit, including one or a combination of two or more of hardware, software or firmware, for example. The "~unit, "device" or "module" may be interchangeably used with a term, for example, a unit, logic, a logical block, a component or a circuit. The "~unit, "device" or "module" may be a minimum unit of an integrated part or a part thereof. The "~unit, "device" or "module" may be a minimum unit in which one or more functions are performed or a part thereof. The "~unit, "device" or "module" may be implemented mechanically or electronically. For example, the "~unit, "device" or "module" according to various embodiments of the disclosure may include at least one of an application-specific integrated circuit (ASIC) chip, field-programmable gate arrays (FPGAs) and a programmable-logic device, which have been known or are to be developed and which perform certain operations.

The embodiments of the disclosure disclosed in the specification and drawings have merely presented specific examples in order to easily describe the technological contents of the disclosure and to help understanding of the disclosure, but are not intended to limit the scope of the disclosure. Accordingly, the scope of the disclosure should be construed as including all changes or modified forms derived based on the technical spirit of the disclosure in addition to the disclosed embodiments.

The invention claimed is:

1. A method performed by an electronic device, the method comprising:
registering user information and user customization setting information with a security server;
detecting a relevant vehicle using an approach check signal from the relevant vehicle; and
performing authentication on the security server using the user information based on the relevant vehicle being detected,
wherein the user customization setting information registered with the security server is forwarded to the relevant vehicle based on the authentication being valid, and
wherein the user customization setting information comprises:
user group information indicating a user group to which the electronic device belongs, the user group comprising electronic devices using same user customization setting information, and
vehicle state customization setting information used for the user group.

2. The method of claim 1, wherein the user customization setting information further comprises at least one of vehicle function restriction information or smart key deactivation information.

3. The method of claim 1, further comprising:
requesting the security server to generate one-time identifier (ID) of the electronic device; and
obtaining the one-time ID from the security server and forwarding the one-time ID to the relevant vehicle,
wherein the user customization setting information registered with the security server is forwarded to the relevant vehicle based on the one-time ID of the relevant vehicle being authenticated by the security server.

4. The method of claim 1, wherein detecting a relevant vehicle comprises obtaining relevant vehicle detection notification from a pairing device paired with the electronic device.

5. A method performed by a security server, the method comprising:
registering user information and user customization setting information obtained from an electronic device;

performing authentication on the user information transmitted by the electronic device based on a relevant vehicle being detected using an approach check signal from the relevant vehicle; and forwarding the registered user customization setting information to the relevant vehicle based on the authentication being valid, wherein the user customization setting information comprises:

user group information indicating a user group to which the electronic device belongs, the user group comprising electronic devices using same user customization setting information, and vehicle state customization setting information used for the user group.

6. The method of claim 5, wherein the user customization setting information further comprises at least one of vehicle function restriction information or smart key deactivation information.

7. The method of claim 5, further comprising:
obtaining a request to generate one-time identifier (ID) of the electronic device from the electronic device;
generating and storing the one-time ID;
forwarding the one-time ID to the electronic device; and
obtaining a one-time ID confirmation request from the relevant vehicle.

8. The method of claim 7, wherein the registered user customization setting information is forwarded to the relevant vehicle if information included in the one-time ID confirmation request corresponds to the stored one-time ID.

9. An electronic device, comprising:
a transceiver transmitting and receiving signals; and
a controller configured to control to:
register user information and user customization setting information with a security server;
detect a relevant vehicle using an approach check signal from the relevant vehicle; and
perform authentication on the security server using the user information based on the relevant vehicle being detected,
wherein the user customization setting information registered with the security server is forwarded to the relevant vehicle based on the authentication being valid, and
wherein the user customization setting information comprises:
user group information indicating a user group to which the electronic device belongs, the user group comprising electronic devices using same user customization setting information, and
vehicle state customization setting information used for the user group.

10. The electronic device of claim 9, wherein the user customization setting information further comprises at least one of vehicle function restriction information or smart key deactivation information.

11. The electronic device of claim 9, wherein the controller is configured to further control to:
request the security server to generate one-time identifier (ID) of the electronic device; and
obtain the one-time ID from the security server and forwarding the one-time ID to the relevant vehicle,
wherein the user customization setting information registered with the security server is forwarded to the relevant vehicle based on the one-time ID of the relevant vehicle being authenticated by the security server.

12. The electronic device of claim 9, wherein the controller is configured to confirm that the relevant vehicle is detected based on relevant vehicle detection notification being obtained from a pairing device paired with the electronic device.

13. A security server, comprising:
a transceiver transmitting and receiving signals;
a storage unit; and
a controller configured to control to:
register user information and user customization setting information obtained from an electronic device;
perform authentication on the user information transmitted by the electronic device based on a relevant vehicle being detected using an approach check signal from the relevant vehicle; and
forward the registered user customization setting information to the relevant vehicle based on the authentication being valid,
wherein the user customization setting information comprises:
user group information indicating a user group to which the electronic device belongs, the user group comprising electronic devices using same user customization setting information, and
vehicle state customization setting information used for the user group.

14. The security server of claim 13, wherein the user customization setting information further comprises at least one of vehicle function restriction information or smart key deactivation information.

15. The security server of claim 13, wherein the controller is configured to further control to:
obtain a request to generate one-time identifier (ID) of the electronic device from the electronic device;
generate and store the one-time ID;
forward the one-time ID to the electronic device; and
obtain a one-time ID confirmation request from the relevant vehicle,
wherein the registered user customization setting information is forwarded to the relevant vehicle if information included in the one-time ID confirmation request corresponds to the stored one-time ID.

* * * * *

UNITED STATES PATENT AND TRADEMARK OFFICE
CERTIFICATE OF CORRECTION

| | | |
|---|---|---|
| PATENT NO. | : 11,381,965 B2 | Page 1 of 1 |
| APPLICATION NO. | : 16/485766 | |
| DATED | : July 5, 2022 | |
| INVENTOR(S) | : Jo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this
Fifteenth Day of November, 2022

Katherine Kelly Vidal
*Director of the United States Patent and Trademark Office*